United States Patent [19]

Murphy et al.

[11] E Re. 29,086

[45] Reissued Dec. 21, 1976

[54] ADJUSTABLE INTERVAL TIME SWITCH DEVICE

[75] Inventors: Robert M. Murphy; James Arthur Hirsch, both of Indianapolis, Ind.

[73] Assignee: P. R. Mallory & Co. Inc., Indianapolis, Ind.

[22] Filed: Nov. 21, 1969

[21] Appl. No.: 878,867

Related U.S. Patent Documents

Reissue of:

[64] Patent No.: 3,267,304
Issued: Aug. 16, 1966
Appl. No.: 266,576
Filed: Mar. 20, 1963

[52] U.S. Cl. ..... 307/141
[51] Int. Cl.[2] ..... H01H 7/14
[58] Field of Search ..... 307/141; 317/22; 194/9

[56] References Cited

UNITED STATES PATENTS

| | | | |
|---|---|---|---|
| 2,288,458 | 6/1942 | Jeffers | 340/41 |
| 2,404,001 | 7/1946 | Smith | 318/444 X |
| 2,962,510 | 11/1960 | Husband | 307/141.4 |
| 3,032,270 | 5/1962 | Corbin | 318/443 X |
| 3,171,045 | 2/1965 | Jacobs | 307/141 |
| 3,173,030 | 3/1965 | Woodruff | 307/141 |
| 3,198,965 | 8/1965 | Roberts | 307/141 |
| 3,201,616 | 8/1965 | Houpt | 307/141 |
| 3,217,206 | 11/1965 | Childers | 340/309.1 X |
| 3,227,821 | 1/1966 | Hauser | 307/141 X |

*Primary Examiner*—Stanley H. Tollberg
*Attorney, Agent, or Firm*—Hoffmann & Meyer

EXEMPLARY CLAIM

1. In a time switch device, electronic means comprising a power supply circuit, a timer circuit, and an output relay circuit, said timer circuit cooperating with said power supply circuit to produce an electrical impulse of predetermined periodicity, said output relay circuit being adapted to dispatch said electrical impulse to initiate operation of a stepping means, said stepping means being adapted to control a timed load function, and said stepping means being further adapted to reset said electronic means after each interval of time so that said electrical impulse may be automatically repeated.

28 Claims, 9 Drawing Figures

INVENTORS
ROBERT M. MURPHY
JAMES ARTHUR HIRSCH
BY
Robert Lemmo
ATTORNEY

INVENTORS
ROBERT M. MURPHY
JAMES ARTHUR HIRSCH
BY
ATTORNEY

INVENTORS
ROBERT M. MURPHY
JAMES ARTHUR HIRSCH
BY
Robert Levine
ATTORNEY

ADJUSTABLE INTERVAL TIME SWITCH DEVICE

Matter enclosed in heavy brackets [ ] appears in the original patent but forms no part of this reissue specification; matter printed in italics indicates the additions made by reissue.

This invention relates generally to time switch devices and has specific pertinence to the means and method for providing an electronically adjustable time interval therein.

Although the contemporary mechanical escapement mechanism finds wide application in modern timing devices, it is subject to certain limitations, among which the following examples are noteworthy. Mechanical failure of the escapement components is a major factor causing limited life. Further, the designer must choose a particular escapement time interval, and thereafter be generally confined to working with only this interval and multiples thereof. The magnitude of angular advance is similarly limited. Also, where several switching operations must be completed in a certain order, the maintaining of close angular tolerances becomes a major problem. Finally, only the energy stored in the escapement spring is available to advance the camshaft.

In one embodiment of the present invention, an electronic escapement is incorporated as a substitute for the familiar mechanical escapement mechanism in a time switch application. The resulting construction represents the integration of an electronic timing unit with an electromechanical impulse and switching unit. Thereby, it becomes possible to overcome each of the aforementioned limitations inherent in the mechanical escapement. The electronic components employed herein are far more reliable than the mechanical parts they replace. Furthermore, the time interval between advances of the camshaft is determined electronically, and is therefore extremely flexible. Thus, the interval may be adjusted manually by external means, or automatically by internal means; or it can be kept constant. Automatic high speed search is also possible if the electronic escapement is bypassed.

The amount of rotational advance is determined mechanically by means of the control cam geometry, said advance being selectable from approximately zero to 360°. Because the camshaft drive motor is operated only intermittently, expected life thereof is substantially increased beyond that of contemporary timers. Using a typical example of a six (6) degree control cam tooth spacing and one-half (½) second motor time per advance, the cumulative motor operating time for 360° or one cycle would be only 30 seconds. Thus 120 cycles are produced from each hour of motor life. Not only is camshaft advancement a function of the control cams, but an advancement interval may be sufficiently long to provide a well defined sequence of switching operations.

Because a direct motor drive is used, the energy available to rotate the camshaft and drive any external load is not inherently limited; hence, the electronic escapement will follow through to complete the impulse. The output torque is simply a function of the choice of motor and reduction gearing. It is further significant that nearly all of the advantages of the mechanical escapement timer are retained herein, especially insofar as switching can still be a rapid advance operation.

The present invention, in another embodiment, may be cooperatively used with a mechanical escapement to lengthen an interval by shutting off the drive motor for a predetermined length of time after each of several chosen advances. In yet another embodiment, the present invention provides a complete multiple-cycle program timer which introduce flexibility heretofore not possible in a mechanical escapement program timer.

In that the electronic unit of this invention is capable of starting a motor after a given time interval, it is also capable of producing a sustained output to cause a relay or solenoid to operate with certainty. In another variation, timing may be made contingent upon the occurrence of some event, after which the time interval may be made long or short as desired. When the time delay is very short, the device may be used for counting. In this manner it is possible to combine coin counting with the control of a programmed device, for example, in a coin-operated dry cleaning machine, or in a vending machine.

The practical applications of the present invention are numerous. As one example, it could readily replace the elaborate washer-dryer combination timers known in today's art. Another application is in the automatic defrosting of refrigerators. The basic technique employed herein may be extended to complicated circuitry that will allow extensive programming.

It is an object of the present invention, therefore, to provide control of a time switch through means other than a mechanical escapement alone.

A further object of the present invention is to provide a timing device wherein the time interval between advances is determined electrically and the amount of advance is determined mechanically. Extreme flexibility of control is thereby attainable.

Another object of the present invention is to provide a reliable electronic escapement system with overcomes the limitations inherent in the mechanical escapement mechanism, yet retains the advantages of the later.

Yet another object of the present invention is to obtain maximum performance, efficiency, and operating life from the drive motor which cooperates with the electronic timer unit.

Still another object of the present invention is to provide a complete multiple-cycle program timer which provides flexibility not attainable in a mechanical escapement program timer.

Still another object of the present invention is to permit the use of an electronic delay system in cooperation with a mechanical escapement.

Yet another object of the present invention is to show adaptation of the basic electronic timing system to programming, searching, counting, event occurrence, and various other control features.

The present invention, in another of its aspects, relates to novel features of the instrumentalities described herein for teaching the principal object of the invention and to the novel principles employed in the instumentalities whether or not these features and principles may be used in the said object and/or in the said field.

Other objects of the invention and the nature thereof will become apparent from the following description considered in connection with the accompanying figures of the drawing and wherein like reference characters describe elements of similar function therein and wherein the scope of the invention is determined rather from the dependent claims.

Generally speaking, the present invention provides flexible control of a time switch through means other than a mechanical escapement alone. By generating an output pulse of predetermined periodicity, it is then possible to transmit this pulse for the purpose of controlling a timed load function. Through a unique means of automatically resetting the pulse generating device during each interval of pulsation, it is thereby possible to cause automatic repetition of the timed impulse.

Accordingly, in one embodiment of this concept, there is provided a camshaft coupled to a driving mechanism, with circuit contact means responsive to camshaft rotation. An electronic circuit emits an output pulse at predetermined intervals, which pulse causes actuation of the driving mechanism. A unique stepping means controls the magnitude of camshaft advancement while being adapted to reset the electronic circuit during each of said advances. Continuity of timed advance is thereby assured as the periodic impulses continue automatically.

Figure 1:
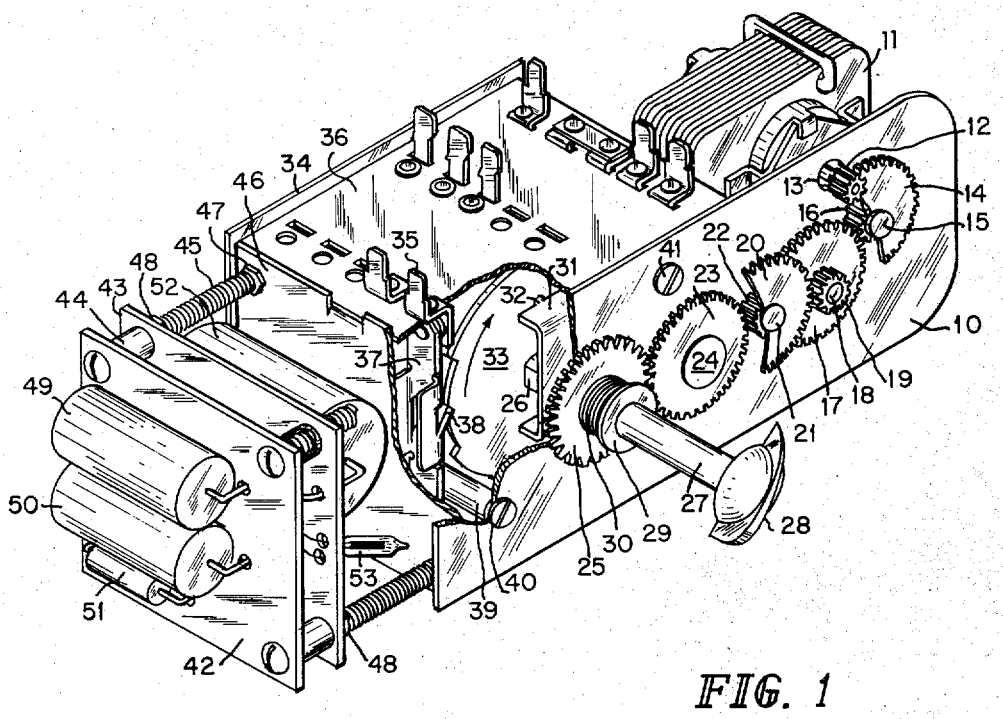
FIG. 1 is a perspective view of one embodiment of the timing device disclosed by the present invention, with the housing partially cut away to expose the cam and switch construction.

Referring now to FIG. 1 of the drawing, the component parts of the electromechanical section of the present timing device can be visualized in conjunction with the following description. Front plate 10, of metallic construction, constitutes a main structural member of the timer assembly. To the rear side of front plate 10 is attached drive motor 11, which need not provide constant speed as called for in the conventional electromechanical timer. An induction motor was chosen for the present embodiment because of its favorable torque characteristics.

To the output shaft of drive motor 11 is attached motor pinion 12, which projects through an aperture 13 formed in front plate 10. Direction of rotation of drive motor 11 is counterclockwise as viewed from the pinion end. Motor pinion 12 meshes with first stage gear 14 which rotates about gear post 15. Rigidly attached to first stage gear 14, and similarly piloted by gear post 15, is first stage pinion 16. The latter pinion thereupon meshes with second stage gear 17 which rotates about gear post 18. Rigidly attached to second stage gear 17, and similarly piloted by gear post 18, is second stage pinion 19.

The third stage of gear reduction from drive motor 11 comprises the engagement of second stage pinion 19 with third stage gear 20. The latter gear rotates about gear post 21. Rigidly attached to third stage gear 20 and similarly piloted by gear post 21, is third stage pinion 22. When third stage pinion 22 meshes with idler gear 23, the fourth and final stage of gear reduction is attained. Idler post 24, which serves to pilot the rotation of idler gear 23, is cantilever mounted in front plate 10 in a manner similar to that of gear posts 15, 18 and 21.

The final driven gear in the reduction train is clutch gear 25, which receives its rotation from idler gear 23. The axis of rotation of clutch gear 25 coincides with that of camshaft 26. However, in order to permit manual advancement of camshaft 26 whenever desired, a clutch mechanism is provided herein. Said clutch mechanism allows manual rotation of camshaft 26 without the necessity of overcoming gear train and motor reaction forces. To clutch shaft 27 is attached control knob 28. Between clutch gear 25 and washer 29 is located a clutch spring 30. Clutch spring 30 is a wrap-around type coil spring which allows unidirectional slippage of the members which it circumferentially engages. Clutch gear 25 is piloted by a reduced diameter of clutch shaft 27 and features an integral shoulder which embraces the inside coil diameter of clutch spring 30, said shoulder constituting one of two clutch inner members. Similarly embracing the inside diameter of clutch spring 30 is a portion of clutch shaft 27 adjacent to the gear shoulder, said shaft portion constituting the second inner member. Both inner members of the clutch have substantially the same outside diameter.

Figure 5:
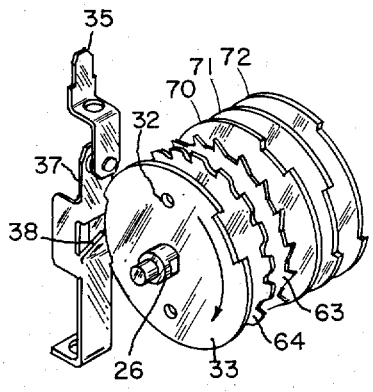
FIG. 5 is a perspective view of a typical camshaft assembly showing one set of switch contacts for illustration.
Figure 6:
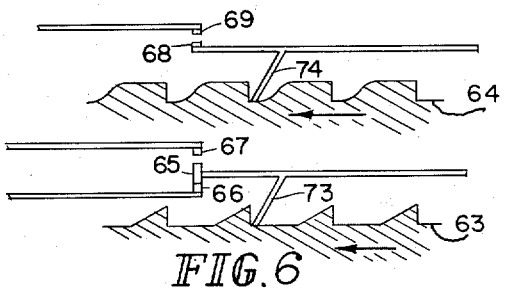
FIG. 6 shows a bridging cam and a control cam in diagrammatic form, along with the cam follower and switch contacts.

Mechanical connection between clutch shaft 27 and the camshaft assembly is accomplished by means of coupling bracket 31, which is rigidly affixed to the inside end of the clutch shaft 27. Two diametrically opposed engagement tangs are formed in coupling bracket 31, shown typically at 32. Said tangs engage respective holes in cam 33 for imparting rotation to the camshaft assembly. For purposes of piloting the camshaft assembly, camshaft 26 has a reduced diameter on its forward end which penetrates a bore on the inside or rear end of clutch shaft 27. Similarly, camshaft 26 has a reduced diameter on its opposite or rear end which penetrates a cantilevered bushing affixed to rear plate 34. Details of the camshaft assembly are illustrated in FIGS. 5 and 6, and the features thereof will be discussed later in this specification.

For purposes of illustration in FIG. 1, a typical set of electrical contacts is shown in cooperation with typical cam 33. Fixed contact assembly 35 is riveted to upper insulating board 36, and is adapted for external attachment of an appropriate lead wire. Movable contact assembly 37 contains an adjustable tab 38 which functions as a cam follower. Because tab 38 is riding the smaller radius of cam 33, the fixed and movable contacts are shown in contiguity. Direction of rotation of cam 33 is indicated by the arrow of FIG. 1. Movable contact assembly 37 is riveted to a lower insulating board and terminated in a manner identical to the attachment of fixed contact assembly 35.

Metallic rear plate 34 constitutes another main structural member of the device shown in FIG. 1. Alignment and retention of rear plate 34 with respect to front plate 10 is provided by two spacer posts, indicated typically at 39. Both spacer posts are affixed to rear plate 34 by swaging, and the attachment of front plate 10 is facilitated by machine screws 40 and 41, which engage internal threads in the forward end of the respective posts.

A very distinctive feature of the present invention is the electronic assembly which cooperates with, and is supported by, the electromechanical unit hereinbefore described. With continued reference to FIGS. 1 and 2 of the drawing, the following description will serve to identify the electronic components contained therein. In the illustrated embodiment, the entire electronic assembly is laid out upon a pair of mounting boards 42 and 43, which are composed of phenolic or other suitable insulating material. Said boards are separated by four hollow plastic spacers, shown typically at 44. Extending through spacers 44 and through holes in boards 42 and 43 are four retaining screws, indicated typically at 45. Said screws penetrate into metallic side plate 46, which is contiguous with, and supported by, front plate 10 and rear plate 34. To retain screws 45 with respect to side plate 46, a lock nut, shown typically at 47, is provided on the inside and outside of plate 46 at each screw location. Similarly, lock nut 48 is typical of the means provided for locating board 43 against spacer 44.

Referring exclusively to FIG. 1, the electronic components visible therein are identified as follows. Relay assembly 49 is of the reed type, comprising a reed coil and a reed switch. Relay assembly 50 comprises a coil and a switch, though not necessarily of the reed construction. Resistor 51 functions as a current limiter in the output relay circuit. Character 52 identifies a capacitor within the timer circuit of this invention, herein called the timing capacitor. Neon lamp 53 is a conventional glow discharge tube employed as a detector in the timer circuit.

Figure 2:
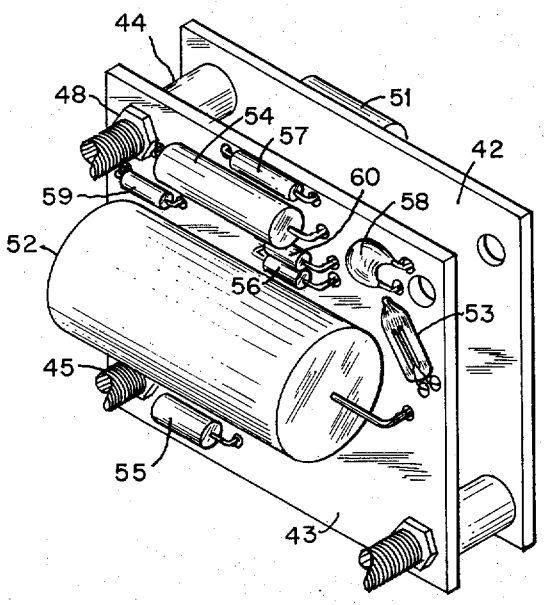
FIG. 2 is a perspective view of the electronic assembly portion of FIG. 1 as viewed from the camshaft side thereof. In order to show all electronic components therein, the mounting board has been revolved 180°, or inverted with respect to the orientation in FIG. 1.

In order to view the remaining components of the electronic unit assembly, FIG. 2 was constructed by separating said unit from the electromechanical portion seen in FIG. 1. For purposes of clarity and accessibility, mounting boards 42 and 43 have been inverted in FIG. 2, with respect to the orientation of FIG. 1. Referring exclusively now to FIG. 2, character 54 identifies a capacitor which functions as a filter in the power supply system of this device. Resistor 55, another component within the timer circuit, serves to discharge timing capacitor 52. Cooperating with timing capacitor 52 and neon lamp 53 to determine the time constant of the timer circuit, is timing resistor 56.

The remaining electronic components to be identified in FIG. 2 are all associated with the power supply circuit of this invention. Character 57 refers to a resistor in series with crystal diode 58. Diode 58, a silicon rectifier, functions to rectify the alternating line current to direct current. Zener diode 59 serves to regulate the direct current supply and resistor 60 cooperates in this regulating function.

To avoid undue confusion within the views of FIGS. 1 and 2, the interconnecting lead wires necessary for a functional embodiment of this device have been largely omitted. Details of the electronic circuitry of this invention are disclosed in subsequent figures of the drawing by way of electrical circuit diagrams.

Figure 3:
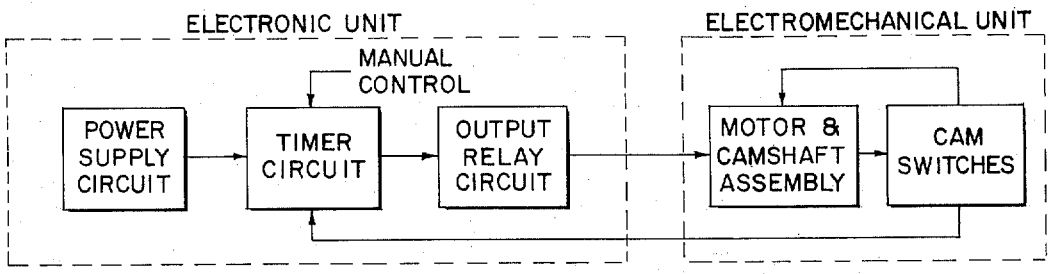
FIG. 3 is a block diagram of the functional elements of the timing device shown in FIGS. 1 and 2.

FIG. 3 presents a block diagram of the functional elements of the device disclosed in FIGS. 1 and 2. The dotted lines of said diagram serve to distinguish the electronic unit from the electromechanical unit. Comprising the electronic assembly are the following three basic circuits: a power supply circuit, a timer circuit, and an output relay circuit. The power supply provides D.C. power and a regulated D.C. voltage. The timer of this embodiment is composed of and R-C circuit with a neon lamp across the capacitor to act as a detector. When the neon lamp fires, it locks the timer on and energizes the output relay circuit. Thereupon, the output relay operates the drive motor which in turn rotates the camshaft. A particular cam within the camshaft assembly, called the "control cam," operates to reset the timer at the appropriate time, thereby de-energizing both the output relay and the drive motor. Another cam of determined configuration within the camshaft assembly, called the "bridging cam," closes the motor circuit for a carry-over period during the resetting operation to avoid the possibility of a dead spot. If such a dead spot were allowed to occur, the timer would be unable to operate again.

Figure 4:
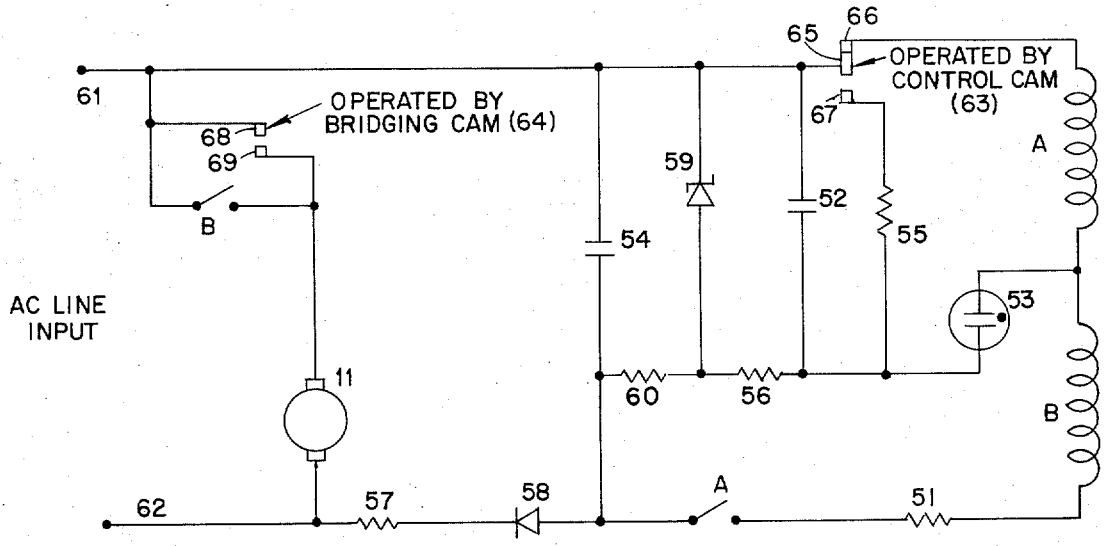
FIG. 4 is an electrical circuit diagram of the system disclosed by the previous views, with appropriate reference characters assigned to the respective components.

FIG. 4 is an electrical circuit diagram representing that embodiment of the invention which was chosen for illustration in FIGS. 1 and 2. Within the diagram of FIG. 4 are included all the components necessary for functional operation of the timing device herein disclosed. Referring first to the power supply circuit, the A.C. line input, herein nominally 115 volts, is introduced by means of leads 61 and 62. In series with silicon rectifier 58 is resistor 57 which, in the instant configuration, has a resistance of 33 ohms. Electrolytic capacitor 54, which serves as a filter within the power supply circuit, has a 10.0 mfd. rating at 200 volts D.C. Zener diode 59, which provides regulation of the D.C. voltage, has a 250 milliwatt rating at 130 volts. Cooperating with Zener diode 59 in the regulating function is resistor 60, which has a resistance value herein of 100,000 ohms. The aforementioned elements form the complete power supply circuit.

With continued reference to FIG. 4, the next unit to be described is the timer circuit, which is basically an elementary R-C timer. Although the value of timing resistor 56 may be adjusted from zero to 25 megohms or more, a resistance of 250,000 ohms was employed herein. Timing capacitor 52, which has an 8.0 mfd. rating at 200 volts D.C., is an electrostatic capacitor of metallized mylar construction. The time constant, therefore, is the product of the value of timing resistor 56 and the value of timing capacitor 52. Numerically, the time constant is two seconds in this example. The time interval, it should be noted, will usually differ somewhat from the R-C time constant. This is because the former is not only a function of the latter, but also a function of the voltage supplied to the timer circuit and the ignition voltage of neon tube 53. If the latter voltage were 83 volts herein, the timed interval would equal the R-C time constant, vis., two seconds. To complete the timer circuit, neon lamp 53 is connected through reed coil A and across timing capacitor 52, through contacts 65 and 66.

Reed coil A and reed switch A comprise the relay assembly denoted by character 49 in FIG. 1. Similarly, coil B and switch B comprise the relay assembly denoted by character 50 in FIG. 1. For schematic purposes and for clarity, the respective coils and switches are shown separated in space in FIG. 4. Relay 49 was specifically selected from the reed type to insure actuation as the ignition and maintaining voltages of neon lamp 53 increase with age.

Functional operation of the electronic escapement can be described as follows. The regulated D.C. power supply from Zener diode 59 causes timing capacitor 52 to commence charging. When neon lamp 53 thereupon reaches its ignition voltage, a sufficiently high transient current flows through reed coil A to close the contacts of reed switch A therein. When reed switch A closes, a circuit path is established so that a continuous current may begin to flow through coil A and coil B, causing reed switch A to remain closed and coil B to operate the contacts of switch B associated therewith. When switch B closes, drive motor 11 will operate to advance the camshaft assembly. At the appropriate time determined by the geometrical configuration of control cam 63, movable contact 65 is transferred from fixed contact 66 to fixed contact 67. At that moment, the timer circuit is reset, thereby de-energizing coils A and B, thus turning off the output relay and drive motor circuits heretofore established. Resistor 55 is thereupon introduced to discharge timing capacitor 52. Bridging cam 64 has already brought contacts 68 and 69 into contiguity so as to maintain rotation of drive motor 11 until the desired advance is completed.

Refer to FIG. 5 for a perspective view of a representative camshaft assembly. Cam 33 is a typical machine function cam and is shown in the same position as previously viewed in the cutaway of FIG. 1. All cams are affixed to camshaft 26 with a pair of horizontally opposed flats. With cam follower 38 riding a recessed segment of cam 33, movable contact assembly 37 is brought into contiguity with fixed contact assembly 35, thereby energizing the particular machine function controlled by that cam. Cams 70, 71, and 72 represent typical variations of cam 33, and likewise may serve to control particular machine functions. When the device of the present invention is addressed to an automatic washing machine installation, the aforementioned cams could serve to control such operations as spinning, rinsing, agitating, suds return, etc. For purposes of clarity, the switch contacts associated with the cams other than cam 33 have been omitted from FIG. 5.

With continued reference to FIG. 5, cam 63 represents a typical saw-tooth configuration of the control cam. Tooth spacing may be any amount approaching 360°, although working embodiments of the present invention have utilizing control cams with advances in the order of 8°. Since the theoretical limit is so broad, the advance may be sufficiently elongated to provide a well-defined sequence of switching operations.

Character 64 in FIG. 5 refers to a typical configuration of the bridging cam. As hereinbefore cited, bridging cam 64 causes rotation of drive motor 11 during resetting of the timer circuit, thereby obviating a motor dead spot. It also serves to insure that the controlled circuit switching is completed, e.g., for agitation, spinning, rinsing, etc. FIG. 6 illustrates schematically how this feature is reflected in the cam design. Character 63 in FIG. 6 represents a typical profile of control cam 63 in diagrammatic form. Similarly, character 64 represents a typical profile of bridging cam 64. Although control cam 63 and bridging cam 64 will usually be configured with an equal number of serrations or teeth, this is not always the case. Similarly, it is not necessary that the respective serrations be regularly spaced. Indeed, it may be desirable to have irregular amounts of camshaft advancement throughout one complete cycle in a given programming application.

Referring still to FIG. 6, it is noted that movable contact 68 is separated from fixed contact 69 when cam follower 74 is riding on the root diameter of bridging cam 64. Whereas, in the schematic view of control cam 63, it is observed that the normally-closed contacts 65 and 66 are in contiguity when cam follower 73 is riding on the root diameter of control cam 63. Said contiguity of contacts 65 and 66 permits the timer circuit to energize the output relay circuit and, in turn, energize drive motor 11, as hereinbefore discussed with reference to FIG. 4. As rotation of camshaft 26 thereupon commences, it is noted that cam follower 74 rises ahead of cam follower 73, in point of time. Thus, continuity is obtained through contacts 68 and 69 even before control cam 63 starts to reset the timer circuit. Sustained power to the motor is thereby assured.

As cam follower 73 in FIG. 6 rises along the saw-tooth ramp of control cam 63, movable contact 65 separates from fixed contact 66 and touches fixed contact 67. Resetting of the timer circuit thereupon occurs. Only when it is certain that the normally closed contacts 65 and 66 of control cam 63 are once again closed, will the contacts of bridging cam 64 be caused to reopen. This action occurs when cam followers 73 and 74 return to the root diameter of their respective cam profiles. At this point, drive motor 11 will coast to a stop. Proper mechanical design will assure sufficient drag torque so that system inertia will not allow camshaft 26 to approach the point where bridging cam 64 may inadvertently reenergize drive motor 11. A drive motor with inherent braking characteristics has been successfully utilized to limit camshaft coast to ½ degree. It is noted that, in actual practice, cam follower 73 does not contact the root diameter of cam 63 at any time. A slight clearance is intentionally maintained to insure proper gram pressure and mating between contacts 65 and 66.

As stated previously, the amount of advance of the camshaft assembly is determined by the control cam geometry. The time interval between advances, however, is determined electrically. In the case of the basic electrical circuit illustrated in FIG. 4, the time interval is fixed by timing capacitor 52, timing resistor 56, and the ignition voltage of neon lamp 53. However, as suggested in the block diagram of FIG. 3, manual control of the time interval may be readily accomplished by external adjustment. In that timing is directly proportional to the capacitance of timing capacitor 52 and the resistance of timing resistor 56, the time interval may be conveniently adjusted by changing either or both of these values. It has been found that the addition of a potentiometer in series with, or in place of, timing resistor 56 provides inexpensive adjustment of the timing interval.

Figure 7:
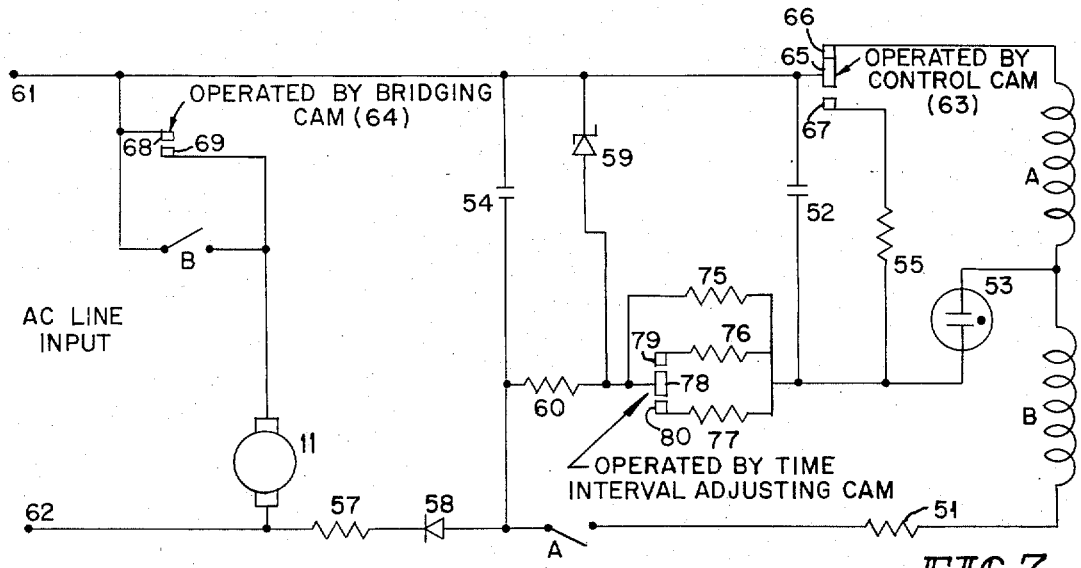
FIG. 7 is a modification of the electrical circuit diagram of FIG. 4, showing the manner in which the time interval may be adjusted by the unit itself.

There are practical applications of the present invention wherein the time interval should be adjusted by the unit itself, rather than by external manual means. FIG. 7 presents an electrical circuit diagram wherein three distinct time intervals are provided. It is noted that FIG. 7 is identical to FIG. 4 except that timing resistor 56 has been replaced by resistors 75, 76, and 77, in addition to a time interval adjusting cam and cooperating electrical contacts. Said cam would simply be an additional member in the typical camshaft assembly shown in FIG. 5. Movable contact 78 is responsive to the time interval adjusting cam, and can assume any one of three positions, viz, touching fixed contact 79, touching fixed contact 80, or in neutral. When movable contact 78 is in neutral, as shown in FIG. 7, the circuit time constant is proportional to the product of the arithmetic values of resistor 75 and capacitor 52.

With continued reference to FIG. 7, when movable contact 78 is caused to touch fixed contact 79, resistor 75 is placed in parallel with resistor 76. The new time constant is therefore proportional to the product of the values of resistor 75, resistor 76, and capacitor 52, divided by the sum of the values of resistors 75 and 76. Similarly, when movable contact 78 is caused to touch fixed contact 80, resistor 75 is placed in parallel with resistor 77. The resulting time constant is then proportional to the product of the values of resistor 75, resistor 77, and capacitor 52, divided by the sum of the values of resistors 75 and 77. In this manner, it is possible to add two time intervals for each additional time interval adjusting cam, assuming that one contact is closed at most. Still more time intervals may be obtained by closing several contacts simultaneously.

Figure 8:
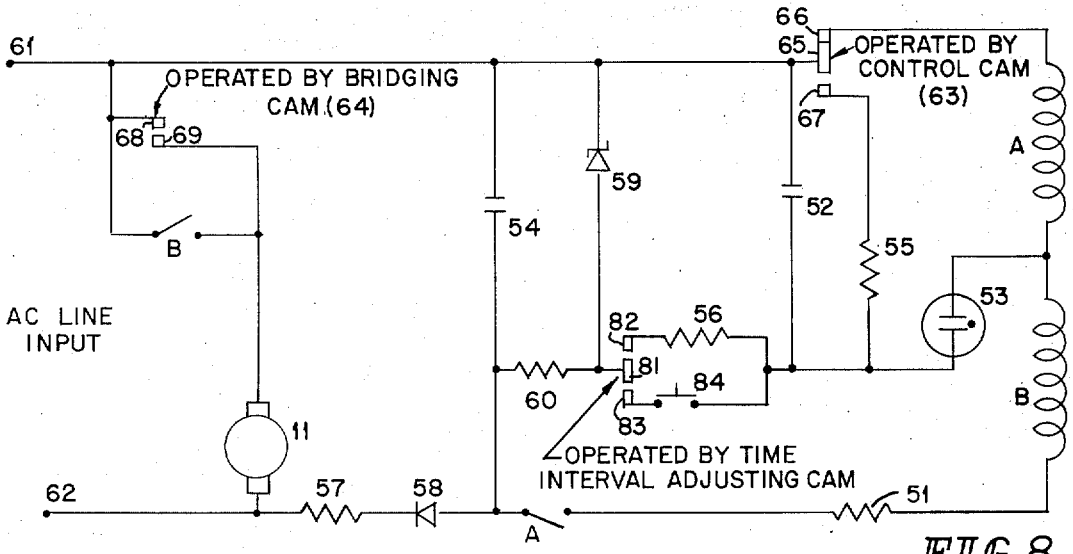
FIG. 8 is another modification of the electrical circuit diagram of FIG. 4, showing an alternate use of the time interval adjusting cam.

FIG. 8 presents an electrical circuit diagram showing another manner in which a time interval adjusting cam may be used. When movable contact 81 therein is urged by the cam to touch fixed contact 82, the time constant is proportional to the product of the values of timing resistor 56 and timing capacitor 52. However, when movable contact 81 is caused to touch fixed contact 83, the time constant approaches infinity, and drive motor 11 will not operate. When switch 84 is closed, the time constant becomes proportional to the product of the values of regulating resistor 60 and timing capacitor 52, numerically a very small quantity. Consequently, timing capacitor 52 charges asymptotically toward the peak voltage of the supply rather than the Zener voltage of Zener diode 59. As a result, neon lamp 53 is ignited very quickly and drive motor 11 advances camshaft 26 at once.

By the method of FIG. 8, therefore, it is possible to control the occurrence of an impulse by any event in the process of the cycle of the controlled machine. If at the end of some process it is possible to indicate completion by closing a switch or the equivalent, it is then simple to use parameters other than time for machine control. If the duration of closure of switch 84 is within a satisfactory range, and if the frequency of closures is sufficiently low so that one impulse is completed before another closure may occur, the system may act as a counter. In particular, the system may act as a combined counter and programmer for any of a class of coin-operated devices.

Figure 9:
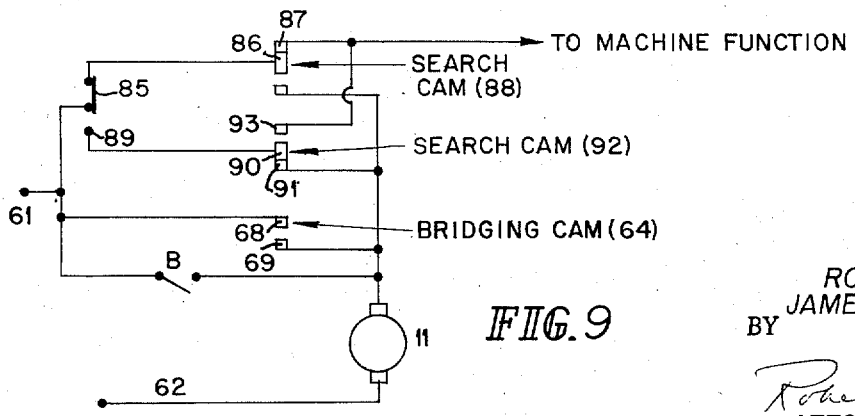
FIG. 9 shows schematically how search features may be added to the basic system of FIG. 4. The circuitry remote from that of the drive motor has been omitted.

FIG. 9 shows diagrammatically low search features may be added to the basic system of FIG. 4. The circuitry remote from that of drive motor 11 has been omitted in FIG. 9, With switch 85 positioned as shown, current flows through contacts 86 and 87 to the various functions of the controlled machine. Note that movable contact 86 is responsive to search cam 88. Were switch 85 to be repositioned so as to engage terminal 89, current would no longer flow to the machine functions. Instead, drive motor 11 would operate, current thus flowing through movable contact 90 and fixed contact 91, both associated with search cam 92. When rotation of search cam 92 subsequently causes movable contact 90 to transfer from fixed contact 91 to fixed contact 93, drive motor 11 will de-energize and the machine functions will again commerce. It is theoretically possible, therefore, to have any number of search positions with an equal number of search cams.

It is important herein to recognize that the basic electronic circuit of this invention, as shown in FIG. 4, may be connected to a mechanical escapement type timer. In such case, it is necessary to cut and position the control cam to correspond with the specifications and clock, setting of the remainder of the timer. The electronic circuitry is introduced when it is desired to extend the length of an interval. Operation will be as heretofore described, except that a substantial period will elapse as drive motor 11 winds up the escapement. When at last the escapement impulses camshaft 26, said camshaft is carried through with stored energy. Because it is inconsequential at what time drive motor 11 turns off once an impulse has started, bridging cam 64 is unnecessary in this configuration.

In summarizing the basic concept of the present invention in light of the many variations derivable therefrom, it may be stated that the overall objective is the control of a timer switch through means other than a mechanical escapement alone. The embodiment chosen for illustration in the drawings employs an electronic timer in cooperation with a drive motor. Numerous variations of this embodiment have been found to give equally satisfactory performance. For example, when used with a universal drive motor, an A.C.-D.C. control is possible.

It should be recognized that the use of a drive motor is not mandatory; a solenoid could be substituted therefor. Furthermore, the driven switch need not be a cam-actuated timer switch; it may be a stepper, a series of relays, or the equivalent. The electronic circuit need not be the exact configuration illustrated in FIG. 4. Another threshold detector may replace neon lamp 53; a light-dependent resistor could also detect current flow through a discharge tube. Alternately, a silicon-controlled rectifier could detect current flow through a discharge tube to perform the function of reed switch A and also the load switching. A second reed might be introduced into reed coil A to perform the load switching.

It is important herein to recognize that the electronic circuit heretofore described is not critical for the operation of such a timer device. There are numerous alternative means for producing an output pulse on a timed interval basis. For example, consider a conventional constant speed timer employing a synchronous motor to drive a camshaft. Said camshaft can thereupon supply an output pulse at regular intervals through mechanical closure of a switch. This output pulse is then used to actuate drive motor 11, previously described, and the system is thus rendered functional. Other means for producing an output pulse on a timed interval basis could be pneumatic, hydraulic, thermal, or nuclear in origin.

The need for bridging cam 64 might be obviated in the following manner. Assume a reliable cam spring which would be made up with a single contact in the steady state, while able to break this contact to make up with another contact on a transient basis. This could be used as a control cam and would eliminate the bridging cam.

The adjustable interval timer device of the present invention, as hereinbefore described in some of its embodiments, is merely illustrative and not exhaustive in scope. Since many widely different embodiments of the invention may be made without departing from the scope thereof, it is intended that all matter contained in the above description and shown in the accompanying drawing shall be interposed as illustrative and not in a limiting sense.

What is claimed is:

1. In a time switch device, electronic means comprising a power supply circuit, a timer circuit, and an output relay circuit, said timer circuit cooperating with said power supply circuit to produce an electrical impulse of predetermined periodicity, said output relay circuit being adapted to dispatch said electrical impulse to initiate operation of a stepping means, said stepping means being adapted to control a timed load function, and said stepping means being further adapted to reset said electronic means after each interval of time so that said electrical impulse may be automatically repeated.

2. In a time switch device, a camshaft supported by a pair of mounting plates, a driving mechanism for imparting controlled rotation to said camshaft, program circuit contact means responsive to rotation of said camshaft, impulse means for actuating said driving mechanism at predetermined intervals of time, stepping means for controlling the magnitude of camshaft advancement, said stepping means including means for resetting said impulse means during each of said camshaft advancements, said stepping means further including means for independently maintaining drive mechanism rotation during resetting of said impulse means, and rotation of said drive mechanism being interrupted by said stepping means after each of said camshaft advancements.

3. In a time switch device, a camshaft supported by a pair of mounting plates, a driving mechanism for imparting controlled rotation to said camshaft, program circuit contact means responsive to rotation of said camshaft, impulse means for actuating said driving mechanism at predetermined intervals of time, stepping means for controlling the magnitude of camshaft advancement, said stepping means comprising a control cam and a bridging cam on said camshaft with associated electrical contact means, said control cam being adapted to reset said impulse means during each of said camshaft advancements, said bridging cam being adapted to independently maintain driven mechanism rotation during resetting of said impulse means, and rotation of said drive mechanism being interrupted by said bridging cam after each of said camshaft advancements.

4. In a time switch device, a camshaft supported by a pair of mounting plates, a drive motor and reduction gear train for imparting controlled rotation to said camshaft, program circuit contact means responsive to rotation of said camshaft, electronic means for actuating said drive motor at predetermined intervals of time, stepping means for controlling the magnitude of camshaft advancement, said stepping means comprising a control cam and a bridging cam on said camshaft with associated electrical contact means, said control cam and said bridging cam having a plurality of serrations of determined profile, the spacing of said serrations corresponding to the magnitude of camshaft advancement desired in response to each of said drive motor actuations, said control cam being adapted to reset said electronic means during each of said camshaft advancements, said bridging cam being adapted to independently maintain drive motor rotation during resetting of said electronic means, and said drive motor being de-energized by said bridging cam after each of said camshaft advancements.

5. In a time switch device, a camshaft supported by a pair of mounting plates, a drive motor and reduction gear train for imparting controlled rotation to said camshaft, program circuit contact means responsive to rotation of said camshaft, clutch means for allowing manual advancement of said camshaft, electronic means for actuating said drive motor at predetermined intervals of time, said electronic means comprising a power supply circuit, a timer circuit, and an output relay circuit, stepping means for controlling the magnitude of camshaft advancement, said stepping means comprising a control cam and a bridging cam on said camshaft with associated electrical contact means, said control cam being adapted to reset said electronic means during each of said camshaft advancements, said bridging cam being adapted to independently maintain drive motor rotation during resetting of said electronic means, and said drive motor being de-energized by said bridging cam after each of said camshaft advancements.

6. In a time switch device for controlling a plurality of electrical circuits according to a determined cycle program, a camshaft supported by a pair of main mounting plates, a drive motor and reduction gear train for imparting controlled rotation to said camshaft, clutch means for allowing manual advancement of said camshaft, a plurality of program cams of determined profile affixed to said camshaft, circuit contact means cooperating with said program cams, electronic means for actuating said drive motor at predetermined intervals of time, said electronic means comprising a power supply circuit, a timer circuit, and an output relay circuit, the components of said electronic means being disposed on insulating boards affixed to a side plate contiguous with said main mounting plates, stepping means for controlling the magnitude of cam shaft advancement, said stepping means comprising a control cam and a bridging cam on said camshaft with associated electrical contact means, said control cam being adapted to reset said electronic means during each of said camshaft advancements, said bridging cam being adapted to independently maintain drive motor rotation during resetting of said electronic means, and said drive motor being de-energized by said bridging cam after each of said camshaft advancements.

7. In a time switch device for controlling a plurality of electrical circuits according to a determined cycle program, a camshaft supported by a pair of main-mounting plates, a drive motor and reduction gear train for imparting controlled rotation to said camshaft, clutch means for allowing manual advancement of said camshaft, a plurality of program cams of determined profile affixed to said camshaft, fixed and movable circuit contact sets responsive to rotation of said program cams and affixed to a pair of opposed insulating plates contiguous with said main mounting plates, electronic means for actuating said drive motor at predetermined intervals of time, said electronic means comprising a power supply circuit, a timer circuit, and an output relay circuit, said timer circuit cooperating with said power supply circuit to produce an electrical impulse of predetermined periodicity, said output relay circuit being adapted to dispatch said electrical impulse to initiate operation of said drive motor, stepping means for controlling the magnitude of camshaft advancement, said stepping means being adapted to reset said timer circuit and open said output relay circuit during each of said camshaft advancements, said stepping means being further adapted to independently maintain drive motor rotation during resetting of said timer circuit, and said driver motor being de-energized by said stepping means after each of said camshaft advancements while awaiting another of said electrical impulses from said timer circuit through said output relay circuit.

8. In a time switch device for controlling a plurality of electrical circuits according to a determined cycle program, a camshaft supported by a pair of main mounting plates, a drive motor and reduction gear train for imparting controlled rotation to said camshaft, clutch means for allowing manual advancement of said camshaft, a plurality of program cams of determined profile affixed to said camshaft, fixed and movable circuit contact sets responsive to rotation of said program cams and affixed to a pair of opposed insulating plates contiguous with said main mounting plates, electronic means for actuating said drive motor at predetermined intervals of time, said electronic means comprising a power supply circuit, a timer circuit, and an output relay circuit, said timer circuit cooperating with said power supply circuit to produce an electrical impulse of predetermined periodicity, said output relay circuit being adapted to dispatch said electrical impulse to initiate operation of said drive motor, stepping means for controlling the magnitude of camshaft advancement, said stepping means comprising a control cam and a bridging cam on said camshaft with associated electrical contact means, said control cam and said bridging cam having a plurality of peripheral serrations of determined profile, the spacing of said serrations corresponding to the magnitude of camshaft advancement desired in response to each of said electrical impulses, said control cam serrations being adapted to reset said timer circuit and open said output relay circuit during each of said camshaft advancements, said bridging cam serrations being adapted to independently maintain drive motor rotation during resetting of said timer circuit, and said drive motor being de-energized by said bridging cam serrations after each of said camshaft advancements while waiting another of said electrical impulses from said timer circuit through said output relay circuit.

9. In a time switch device for controlling a plurality of electrical circuits according to a determined cycle program, a camshaft supported by a pair of main mounting plates, a drive motor and reduction gear train for imparting controlled rotation to said camshaft, clutch means for allowing manual advancement of said camshaft, a plurality of program and search cams of determined profile affixed to said camshaft, fixed and movable circuit contact sets responsive to rotation of said cams and affixed to a pair of opposed insulating plates contiguous with said main mounting plates, electronic means for actuating said drive motor at predetermined intervals of time, stepping means for controlling the magnitude of camshaft advancement, said means comprising a control cam and a bridging cam on said camshaft with associated electrical contact means, said control cam being adapted to reset said electronic means during each of said camshaft advancements, said bridging cam being adapted to independently maintain drive motor rotation during resetting of said electronic means, searching means for causing continuous advancement of said camshaft for a period determined by the geometry of said search cams, switching means for bypassing said stepping means throughout said search period, and said stepping means being adapted to automatically resume functioning upon expiration of said search period.

10. In a time switch device for controlling a plurality of electrical circuits according to a determined cycle program, a camshaft supported by a pair of main mounting plates, a drive mechanism for imparting controlled rotation to said camshaft, clutch means for allowing manual advancement of said camshaft, a plurality of program cams of determined profile affixed to said camshaft, fixed and movable circuit contact sets responsive to rotation of said cams and affixed to a pair of opposed insulating plates contiguous with said main mounting plates, electronic means for actuating said drive mechanism at predetermined intervals of time, said electronic means comprising a power supply circuit, a timer circuit, and an output relay circuit, time interval adjusting means comprising variable control of the time constant of said timer circuit, stepping means for controlling the magnitude of camshaft advancement, said stepping means including means for resetting said timer circuit and open said output relay circuit during each of said camshaft advancements, said stepping means further including means for independently maintaining drive mechanism rotation during resetting of said timer circuit, and rotation of said drive mechanism being interrupted by said stepping means after each of said camshaft advancements.

11. In a time switch device for controlling a plurality of electrical circuits according to a determined cycle program, a camshaft supported by a pair of mounting plates, a drive mechanism for imparting controlled rotation to said camshaft, a plurality of program cams of determined profile affixed to said camshaft, fixed and movable circuit contact sets responsive to rotation of said cams, electronic means for actuating said drive mechanism at predetermined intervals of time, said electronic means comprising a power supply circuit, a timer circuit, and an output relay circuit, time interval adjusting means cooperating with said electronic means and responsive to camshaft advancement, said time interval adjusting means comprising cam-actuated switch means adapted to change the time constant of said timer circuit by a determined quantity for a determined period, stepping means for controlling the magnitude of camshaft advancement, said stepping means including means for resetting said timer circuit and open said output relay circuit during each of said camshaft advancements, said stepping further including means for independently maintaining drive mechanism rotation during resetting of said timer circuit, and rotation of said drive mechanism being interrupted by said stepping means after each of said camshaft advancements.

12. In a time switch device for controlling a plurality of electrical circuits according to a determined cycle program, a camshaft supported by a pair of mounting plates, a drive mechanism for imparting controlled rotation to said camshaft, a plurality of program cams of determined profile affixed to said camshaft, fixed and movable circuit contact sets responsive to rotation of said cams, electronic means for actuating said drive mechanism at predetermined intervals of time, said electronic means comprising a power supply circuit, a timer circuit, and an output relay circuit, time interval adjusting means cooperating with said electronic means and responsive to camshaft advancement, said time interval adjusting means comprising cam-actuated switch means adapted to change the time constant of said timer circuit from a determined quantity to an infinite quantity so as to interrupt drive mechanism rotation, switch means responsive to the occurrence of an event within said cycle program, said switch means being adapted upon closure to restore a finite time constant within said timer circuit for rapid advancement of said camshaft, said rapid advancement causing said time interval adjusting means to select the original time constant of said timer circuit, stepping means for controlling the magnitude of camshaft advancement during the timed portion of said cycle program, said stepping means including means for resetting said timer circuit and open said output relay circuit during each of said camshaft advancements, said stepping means further including means for independently maintaining drive mechanism rotation during resetting of said timer circuit, and rotation of said drive mechanism being interrupted by said stepping means after each of said camshaft advancements.

*13. In a time switch device, electronic means comprising a power supply circuit, a timer circuit, and an output relay circuit, said timer circuit including a pre-conditioning means, said timer circuit cooperating with said power supply to produce an electrical impulse of predetermined periodicity, said output relay circuit being adapted to dispatch said electrical impulse to initiate operation of a stepping means, said stepping means being adapted to control a timed load function and said stepping means being further adapted to reset said electronic means after such interval of time so that said electrical impulse may be automatically repeated.*

*14. In an appliance control circuit having an incrementally movable timer device for controlling the duration of a cycle of operation of an appliance and having switch means for actuation a predetermined number of times as a precondition to operation of the appliance,*

*precondition means requiring actuation as a precondition to setting of said appliance in operation,*

*timer control means controlling actuation of said timer device and responsive to actuation of said switch means to step said timer device through an increment of movement,*

*timer actuation responsive means coupled to said precondition means and to said timer device and responsive to a predetermined number of increments of movement of said timer device to actuate said precondition means, and*

*means under the control of said precondition means for thereafter enabling the automatic cycling of said timer device to control the duration of a cycle of operation of the appliance.*

*15. In an appliance control circuit,*

*a timer device for actuation step-by-step to drive a plurality of sequencing elements of an appliance,*

*relay means controlling energization of said timer device and having first and second energizing circuits,*

*a first switch controlling said first energizing circuit of said relay means,*

*a second switch controlling said second energizing circuit of said relay means,*

*means for actuating said first switch a predetermined number of times in response to fulfillment of a predetermined condition to actuate said relay means and thus actuate said timer device a corresponding number of times, and*

*means controlling said second switch and responsive to actuation of said timer device said predetermined number of times to actuate said second switch.*

*16. In an appliance control circuit,*

*a series of sequencing elements for movement to control the operation of an appliance,*

*a rotatable timer drive device for driving said sequencing elements and having an energizing circuit,*

*timer operating means controlling said energizing circuit of said timer drive device and operable to incrementally actuate said timer drive device, and*

*a timing circuit providing a variable timing interval between the incremental actuations of said rotatable timer drive device for controlling operation of said sequencing elements.*

*17. In an appliance control circuit,*

*a series of sequencing elements for movement to sequence the operation of an appliance,*

*a rotatable timer drive device for driving said sequencing elements and having an energizing circuit,*

*a relay controlling said energizing circuit of said timer drive device and having a relay actuating circuit operable to incrementally actuate said rotatable timer drive device,*

*a timing circuit providing a variable timing interval between the incremental actuations of said rotatable timer drive device for controlling the operation of said sequencing elements,*

*said timing circuit having a plurality of time interval control elements, and*

*means responsive to rotational movement of said rotatable timer drive device to connect different ones of said time interval control elements in said timing circuit at respective times in the operation of said rotatable timer drive device.*

*18. In an appliance control circuit,*

*a series of sequencing elements for movement to control the operation of an appliance,*

*a rotatable timer drive device for driving said sequencing elements and having an energizing circuit,*

*timer operating means controlling said energizing circuit of said rotatable timer drive device and operable to incrementally actuate said rotatable timer drive device,*

*a timing circuit providing a variable timing interval between the incremental actuations of said rotatable timer drive device for controlling the operation of said sequencing elements,*

*said timing circuit having a plurality of time interval control elements, and*

*means responsive to movement of said rotatable timer drive device to connect different ones of said time interval control elements in said timing circuit at respective times in the operation of said rotatable timer drive device.*

*19. In an appliance control circuit,*

*a series of sequencing elements for movement to vary the operation of appliance,*

*a motor for driving said sequencing elements and having an energizing circuit,*

*a relay controlling said energizing circuit of said motor and having a relay actuating circuit,*

*a timing circuit providing a variable timing interval and controlling said relay actuating circuit to vary the speed of operation of said sequencing elements, said timing circuit being controlled by a series of variable width pulses, and*

*means for adjusting the width of said variable width pulses to correspondingly adjust the speed of operation of said sequencing elements.*

*20. In an appliance,*

*a step-by-step timer device comprising:*

*a motor having an alternating current actuating circuit,*

*a series of sequencing elements driven by said motor, relay means controlling said alternating current actuating circuit of said motor and having a start circuit for periodic energization during operation of the appliance in response to the position of said sequencing elements to incrementally actuate said motor, and*

*means responsive to movement of said motor at the end of a cycle of operation to automatically interrupt said start circuit.*

*21. An appliance,*

*control system comprising:*

*a step-by-step timer device having an actuating circuit, relay means controlling said actuating circuit of said timer device and having actuating means controlling actuation of said relay means,*

*means for holding said relay means actuated after actuation thereof for a limited time interval,*

*time delay means providing a time delay and operable after said time delay to energize said actuating means after each movement of said timer device, and*

*means responsive to said timing device for automatically changing the time delay provided by said time delay means in respective parts of the appliance cycle.*

*22. In an appliance,*

*a step-by-step timer device having an actuating circuit,*

*relay means controlling said actuating circuit of said timer device and having a start circuit for actuation to operate said timer device,*

*means for holding said relay means actuated after actuation thereof,*

*means for releasing said relay means,*

*means responsive to an increment of movement of said timer device to momentarily energize said releasing means to release said relay means,*

*a variable timing circuit controlling actuation of said start circuit and adjustable for selectively changing the speed of operation of said timer device, and*

*sequencing elements driven by said timer device and having rates of advance which are collectively varied by adjustment of said variable timing circuit.*

*23. In an appliance control circuit having an incrementally movable timer device for controlling a cycle of operation of an appliance and having a switch for actuation a plurality of times as a precondition to operation of the appliance,*

*precondition means requiring actuation as precondition to setting of said appliance in operation,*

*timer control means controlling actuation of said timer device and responsive to each actuation of said switch to step said timer device through an increment of movement,*

*timer actuation responsive means coupled to said precondition means and to said timer device and responsive to a predetermined number of increments of movements of said timer device to actuate said precondition means,*

*means under the control of said precondition means for thereafter enabling the automatic cycling of said timer device to control a cycle of operation of the appliance, and*

*means responsive to the timer device reaching a point near the end of its cycle to continuously energize said time device for continuous movement thereof to a reset position.*

*24. In a machine control circuit,*

*a plurality of sequencing elements for movement to control the operation of a machine,*

*drive means periodically advanced in increments for driving said sequencing elements,*

*an energizing circuit for supplying electrical energy to said drive means for actuation thereof and including energizing circuit control means for controlling the energization of said energizing circuit,*

*a starting circuit for controlling the energizing circuit control means,*

*a timing circuit periodically completing said starting circuit for closing said energizing circuit through said energizing circuit control means and energizing said drive means, and*

*a terminating circuit including means operated by the actuation of said drive means for opening said energizing circuit through said energizing circuit control means to deactuate said drive means.*

*25. A programming device for sequentially actuating a plurality of controlled circuit elements throughout an operational cycle and providing a series of intervals of varying duration between the sequential actuations of said controlled circuit elements comprising:*

*a control circuit electrically connected to said controlled circuit elements for the energization thereof,*

*switch means in said control circuit controlling the energization of said controlled circuit elements,*

*programming means regulating the actuation of said switch means,*

*drive means driving said programming means through a series of operational positions for sequential actuation of said switch means,*

*an energizing circuit for supplying electrical energy to said drive means and including energizing circuit control means for controlling the energization of said energizing circuit,*

*a starting circuit for controlling the energizing circuit control means,*

*a timing circuit automatically sending periodic pulses to said starting circuit for closing said energizing circuit through said energizing circuit control means and energizing said drive means,*

*said timing circuit including variable time delay means for establishing the duration of the intervals between said periodic pulses, and*

*a terminating circuit including means operated by the energization of said drive means for opening said energizing circuit through said energizing circuit control means to deenergize said drive means.*

*26. A control system for sequentially operating a plurality of devices of a machine, comprising:*

*a power source,*

*a drive motor,*

*a first group of switches for controlling the energizing of said devices,*

*a second group of switches,*

*first and second groups of sequencing elements connected to said motor for rotation therewith,*

*each of said first group of sequencing elements positioned adjacent a corresponding one of said first group of switches for actuation thereof, and each of said second group of sequencing elements positioned adjacent a corresponding one of said second group of switches for actuation thereof, a motor energizing circuit for selectively connecting said drive motor to said power source,*

*a control circuit including said second group of switches and said second group of sequencing elements for generating sequencing signals,*

*a starter circuit connected between said motor energizing circuit and said control circuit for actuating said motor energizing circuit in response to said sequencing signal to energize said drive motor, and*

*a terminating circuit connected between said power source and said drive motor and operable by said drive motor for deenergizing thereof in response to rotation of said drive motor through a preselected guantum of rotation.*

*27. The control system of claim 26 wherein said motor energizing circuit includes an electronic switching device having anode and cathode electrodes and a controlled electrode, and said controlled electrode being connected to said starting circuit to render said electronic switching device conductive in response to said sequencing signal.*

*28. In a machine control circuit, a plurality of sequencing elements for movement to control the operation of a machine,*

*drive means periodically advanced in increments for driving said sequencing elements,*

*an energizing circuit for supplying electrical energy to said drive means for actuation thereof and including energizing circuit control means having a selectively conductive silicon controlled rectifier for controlling the energization of said energizing circuit,*

*a start circuit for controlling the energizing circuit control means including a gate circuit connected to said silicon controlled rectifier for controlling the conductive state thereof,*

*a time circuit periodically completing said starting circuit for closing said energizing circuit through said energizing circuit control means and energizing said drive means, and*

*a terminating circuit including means operated by the actuation of said drive means for opening said energizing circuit through said energizing circuit control means to deactuate said drive means.*

* * * * *